United States Patent [19]
Wesselman et al.

[11] 3,768,831
[45] Oct. 30, 1973

[54] DETECTING AND ACTIVATING DEVICE

[75] Inventors: James L. Wesselman, Trenton; Allen C. Wright, Dearborn Heights, both of Mich.

[73] Assignee: Ford Motor Company, Dearborn, Mich.

[22] Filed: June 7, 1971

[21] Appl. No.: 150,316

[52] U.S. Cl. ............................ 280/150 AB, 180/91
[51] Int. Cl. .......................................... B60r 21/08
[58] Field of Search .................. 280/150 AB, 150 B; 180/82, 91, 92, 93, 94, 95, 96, 97, 103

[56] References Cited
UNITED STATES PATENTS

| | | | |
|---|---|---|---|
| 2,931,665 | 4/1960 | Sandor | 280/150 AB |
| 2,796,944 | 6/1957 | Clement, Jr. | 180/96 X |
| 3,172,684 | 3/1965 | Isaac | 280/150 AB |
| 3,653,684 | 4/1972 | Plumer | 280/150 AB |

*Primary Examiner*—Kenneth A. Betts
*Assistant Examiner*—John P. Silverstrim
*Attorney*—John R. Faulkner and William E. Johnson

[57] ABSTRACT

A device for detecting a crash of a vehicle and for activating a safety system for passengers of the vehicle is disclosed. The vehicle has a crushable member and a relatively stationary member forming portions thereof. The device includes a cable structure having a cable core and a cable sheath enclosing the core. The cable sheath is fixed in its relationship to the stationary member of the vehicle. Mounting structure secures a first end of the cable core to the crushable member of the vehicle. Additional mounting structure secures the portion of the cable sheath adjacent a second end of the cable core in a fixed position so that the second core end is guided thereby along a path of movement when the first core end is moved during a crash of the vehicle. An activating device is engageable by the second cable core end when moved along its path of movement. The activating device deploys a safety system for passengers of the vehicle when engaged by the second free end of the cable core.

5 Claims, 5 Drawing Figures

Patented Oct. 30, 1973
3,768,831
2 Sheets-Sheet 1
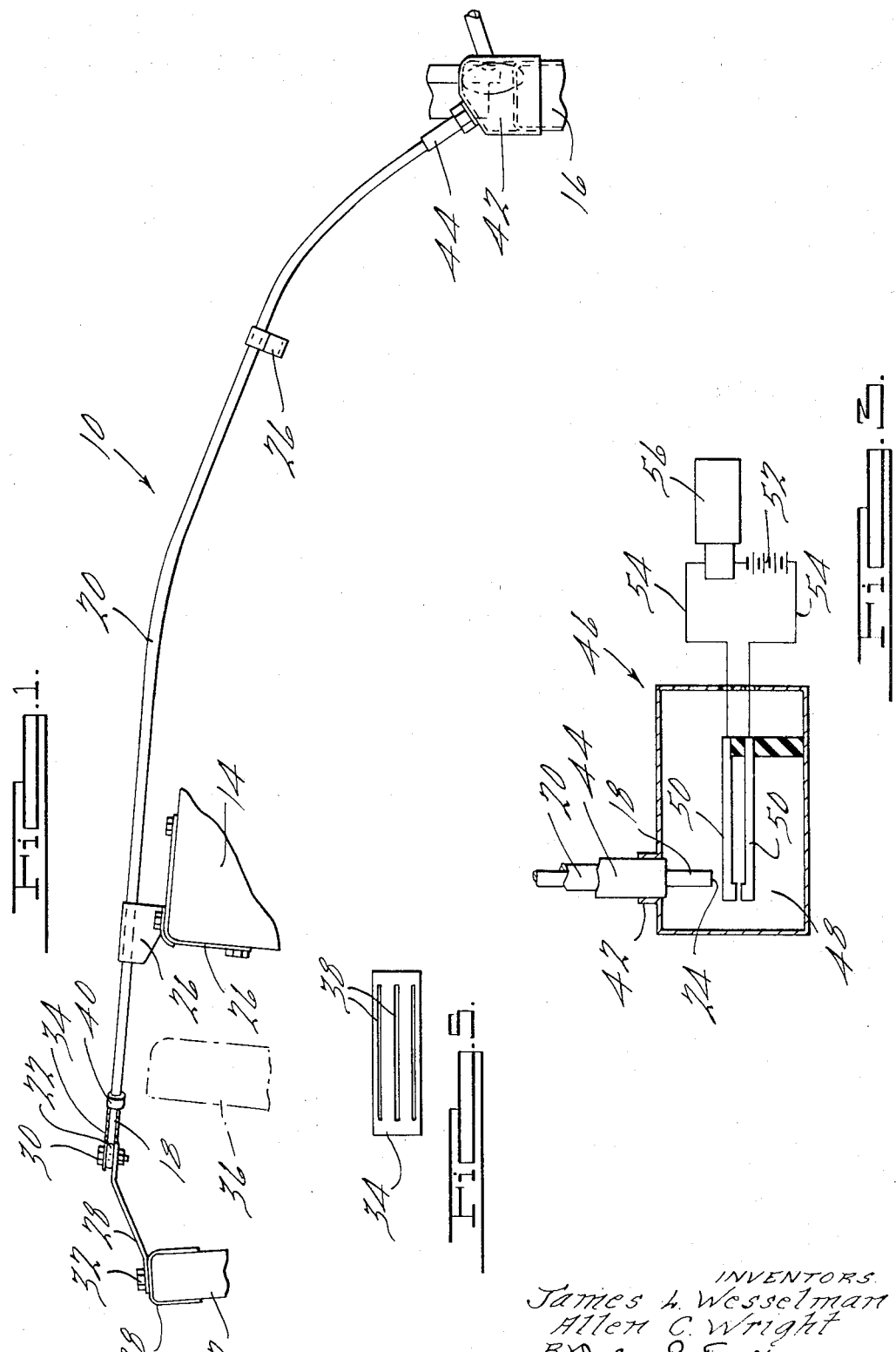

Patented Oct. 30, 1973
3,768,831
2 Sheets-Sheet 2
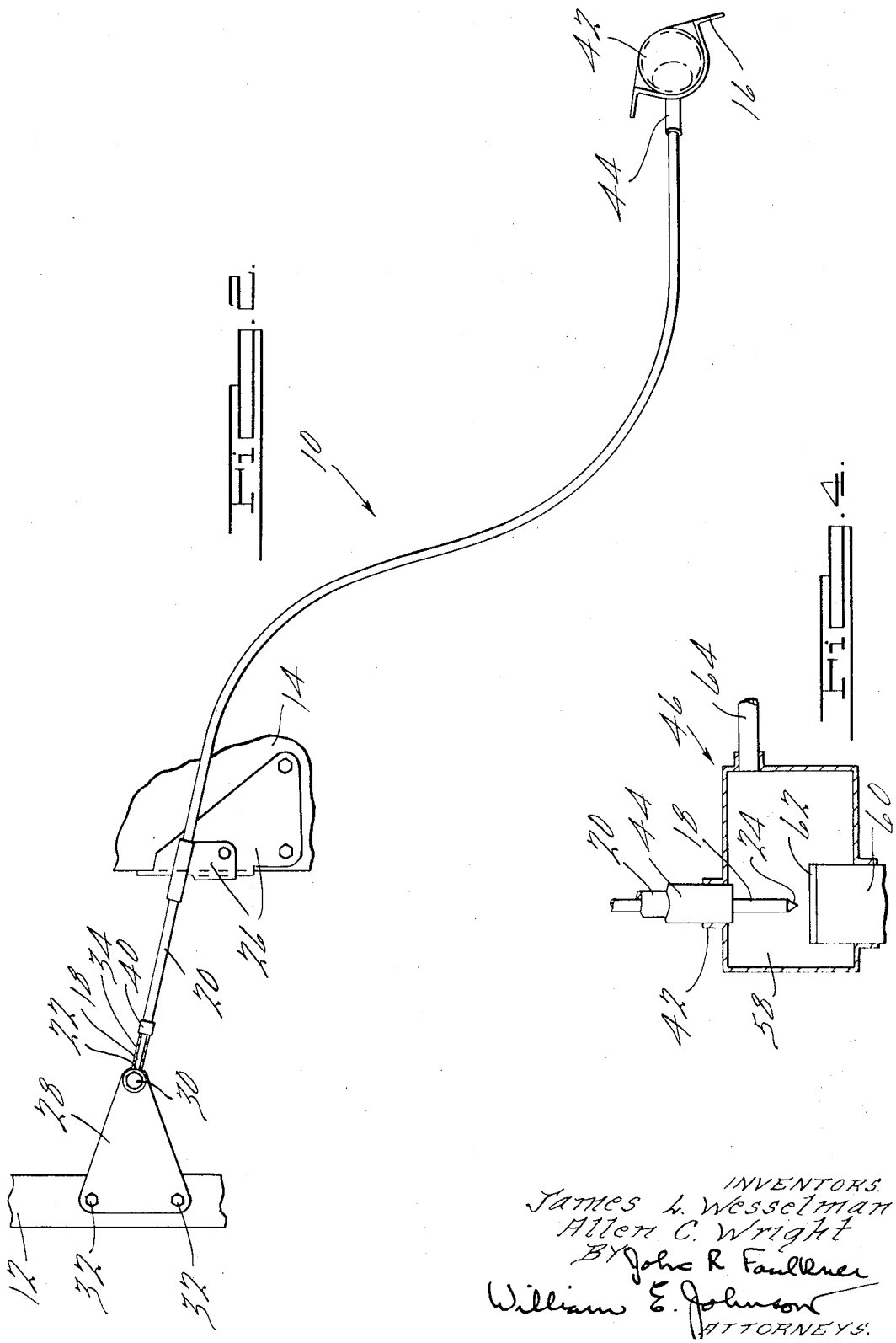
INVENTORS.
James L. Wesselman
Allen C. Wright
BY John R. Faulkner
William E. Johnson
ATTORNEYS.

3,768,831

DETECTING AND ACTIVATING DEVICE

BACKGROUND OF THE INVENTION

This invention is in the field of devices used for detecting a crash of a motor vehicle. Once a crash of the motor vehicle is detected, such devices function to activate a safety system for the passengers of the motor vehicle. Several U.S. patents have already issued on devices for detecting a crash and activating a safety system. Particular reference is made to the following U.S. patents which show representative devices: Nos. 3,070,675; 3,485,973; and 3,495,675.

The devices disclosed in the above enumerated patents are generally of elaborate and complex construction. Since they are elaborate and complex, the cost thereof is quite high.

The detecting and activating device of this invention is of simple design when compared with the prior art. Since the device is of simple design, the cost thereof is reduced as compared to devices known in the prior art.

SUMMARY OF THE INVENTION

This invention relates to a device for detecting a crash of a vehicle and for activating a safety system for passengers of the vehicle and, more particularly, to a device for detecting a crash of a vehicle and for activating a safety system in a vehicle which has a crushable member and a relatively stationary member contained therein.

The detecting and activating device of this invention has the following general elements in its construction. A cable structure is provided which has a cable core and a cable sheath encircling the same. The cable core is movable within the sheath. The core has a first end and a second end extending beyond the ends of the sheath. First mounting structure secures the cable sheath in a fixed relationship to the stationary member of the vehicle. Second mounting structure secures the first end of the cable core to the crushable member of the vehicle. Third mounting structure secures the portion of the cable sheath adjacent the second end of the cable core in a relatively fixed position. This third mounting structure positions the second cable core end so that it is guided by the sheath for movement along a set path when the first core end is moved within the sheath during a crash of the vehicle. An activating device is provided which is engageable by the second cable core and when moved along its path of movement. The activating device deploys the safety system for the passengers of the vehicle when the activating device is engaged by the second end of the cable core.

In greater detail, the activating device of the invention may take the form of either an electrical system or a mechanical system. Whether an electrical system or a mechanical system is chosen for the activating device, the device is coupled to deployment apparatus which deploys the safety system for passengers of the vehicle.

In still greater detail, the crushable member of the vehicle may be its radiator. In this case, the relatively stationary member of the vehicle could be the motor vehicle's engine. In such a case, when the radiator is subjected to a crush, it moves with respect to the vehicle's engine and thereby causes movement of the cable core of the cable structure. When the cable core is moved upon movement of the radiator towards the engine, the second free end of the cable core is displaced along its set path of movement. This displacement of the cable core results in actuation of the activating device to deploy the safety system for the vehicle passengers.

BRIEF DESCRIPTION OF THE DRAWINGS

FIG. 1 is an elevation view, partly in cross section, showing the detecting and activating device of this invention installed in a motor vehicle.

FIG. 2 is a plan view of the device shown in FIG. 1.

FIG. 3 is a schematic view, partly in cross section, of an activating device which may be employed with the device of FIGS. 1 and 2.

FIG. 4 is a schematic view, partly in cross section, of a second embodiment of an activating device which also may be employed with the device of FIGS. 1 and 2.

FIG. 5 is an exploded view showing the details of a protective member employed with the device of this invention.

DESCRIPTION OF THE PREFERRED EMBODIMENT

CONSTRUCTION

Reference is now made to the drawings which show the device for detecting a crash of a vehicle and for activating a safety system for passengers of the vehicle. In the drawings, the device of this invention is generally identified by the numeral 10. The device is employed in a motor vehicle (not shown) which contains a crushable member, such as a radiator 12, and a relatively stationary member, such as an engine 14 (shown only in part). A portion of a fire wall 16 of the vehicle is also shown in FIGS. 1 and 2.

The device 10 includes a cable structure having a cable core 18 and a cable sheath 20. The cable core 18 has a first end 22 and a second free end 24 (FIGS. 3 and 4) extending beyond the ends of the cable sheath. The cable core is movable within the cable sheath.

A first set of brackets 26—26 are secured at one end to the engine 14 of the vehicle. The other end of the first brackets rigidly grip the cable sheath 20 of the cable structure. The brackets 26—26 hold the cable sheath in a fixed position with respect to the motor vehicle such that the cable core 18 may be moved therewithin.

A set of second brackets 28—28 attach the first end 22 of the cable core 18 to the radiator 12. In particular, the first end of the cable core is looped about a fastener 30 and then secured to a first one of the second brackets 28—28. The other of the first brackets is secured by means of fasteners 32—32 to the top of the radiator.

A protective member 34, shown best in FIG. 5, encircles the cable core 18 at a position above a fan blade 36 of the vehicle engine 14. The protective member has a plurality of slits 38 therein running along the length thereof. The protective member is positioned between the first end 22 of the core and an associated end 40 of the cable sheath 20. In this position, the protective member keeps dirt and other materials off of the core of the cable structure so that the same does not become inoperative because of deposits of materials thereon. When the first end 22 of the cable is moved toward the associated end 40 of the cable sheath, the slits in the protective member allow the protective member to be deformed by collapsing thereby permitting the relative movement of the cable core and the cable sheath.

Mounting structure 42 is secured to the fire wall 16 of the vehicle on the opposite side of the vehicle engine 14 from the second brackets 28—28. The mounting structure 42 engages and rigidly fixes the location of a second end 44 of the cable sheath 20. As best seen in FIGS. 3 and 4, once the second end 44 of the cable sheath is fixed, the second free end 24 of the cable core 18 is guided along a predetermined path of movement when the first end 22 of the core moves within the cable sheath.

The second free end 24 of the cable core 18 of the cable structure is associated with an activating device, generally designated by the numeral 46, for deploying a safety system for passengers of the motor vehicle. In FIG. 3 there is shown an electrical activating device 46. In FIG. 4 there is shown a mechanical activating device 46.

Reference is now made to FIG. 3 which shows the electrical activating device 46. In the electrical device, the mounting structure 42 is formed so that it defines a generally closed volume 48 which contains a pair of contacts 50—50. The contacts are generally in an open position with the free ends thereof aligned with the path of travel of the end 24 of the cable core 18. A battery 52 and lead wires 54 are provided to connect the contacts to a gas generation device 56. When an electrical signal is applied to the gas generation device by a closing of the contacts 50, an air bag (not shown) associated with the device is deployed within the interior of the passenger compartment of the vehicle. The deployment of such a bag is well known in the art and no further discussion thereof will be undertaken herein.

In FIG. 4 there is shown the mechanical activating device 46 for the device 10 of this invention. In this case, the mounting structure 42 defines a closed, gas tight volume 58. A gas supply canister 60 intrudes partially within the closed volume 58. The gas supply canister contains a gas under pressure. The canister has a breakable surface 62 thereon which seals the canister. This breakable surface may be formed from a puncturable metal surface and it is aligned and in the path of travel of the second end 24 of the cable core 18. In this case, the second end of the core is sharpened to a point. The point peirces the breakable surface on the canister when the cable core is shifted within its sheath. A gas supply line 64 connects the interior volume of the device to an air bag structure (not shown). When the free end 24 of the cable core breaks the surface on the canister, the released gas is directed through the gas supply line to inflate the air bag in a manner already well known in the art. No further discussion of the air bag deployment mechanism will be undertaken herein.

OPERATION

When the motor vehicle containing the detecting and activating device 10 of this invention is involved in a front end crash, the device of the invention will operate as follows. The radiator 12, which is crushable, is displaced in a direction toward the engine 14 of the vehicle. The engine remains in a substantially stationary position during the initial crushing of the front end of the vehicle. Thus, a relative movement is established between the radiator and the engine. The relative movement of these two members causes a relative movement of the cable core 18 in the cable sheath 20. This movement is accomplished as the first end 22 of the cable core is shifted toward the free end 40 of the cable sheath. This initial shifting causes the protective member 34 to be deformed as previously explained.

If an electrical system is employed for the activating device 46, the shifting of the cable core 18 causes the second end 24 to be brought into engagement with the pair of contacts 50—50. Closing of the contacts connects the electrical supply 52 through leads 54 to the gas generating device 56. Actuation of the gas generating device causes inflation of the air bag in the passenger compartment.

If a mechanical system is used for the activating device 46, the deployment of the safety system would be as follows. The shifting of the cable core 18 within the cable sheath 20 causes the second end 24 of the core to be moved along its path of movement. This movement of the second end brings the same into contact with the breakable surface 62 on the gas canister 60. Breaking of the surface 62 releases the gas within the interior of closed volume 58. The gas is, in turn, directed through the gas supply line 64. The gas supply line is connected to the air bag (not shown) and thus permits inflation of the bag to protect the passengers of the vehicle.

There has been disclosed herein a device for detecting a crash of a vehicle and for actuating a safety system for passengers of the vehicle. The device of this invention is relatively simple in construction. While the device has been disclosed as being employed between a crushable radiator and a relatively stationary engine, it is of course obvious to one skilled in the art that the device may be employed between any two members. The only requirement is that one member is crushed during the initial portion of a crash while the other member is relatively stationary during the initial portion of the crash. For example, the device could be connected between the rear bumper, as a crushable member, and the rear axle, as a stationary member.

In view of the teachings of this specification, many modifications of this invention will become apparent to those skilled in the art. It is intended that all such modifications which fall within the true spirit and scope of this invention be included within the appended claims.

We claim:

1. A device for detecting a crash of a vehicle and for actuating a safety system for passengers of the vehicle, the vehicle having an engine and a radiator mounted forwardly of the engine, which device comprises:
   a cable structure having a cable core and a cable sheath enclosing said core and shorter than said core so that said core has a first end and a second end extending beyond said sheath, said core being movable within said sheath;
   first brackets mounting said cable sheath in a fixed relationship to the vehicle engine;
   second brackets mounting said first end of said cable core to the vehicle radiator with a portion of the length of said first core end exposed from said cable sheath;
   mounting structures secured to the vehicle in a position on the opposite side of the vehicle engine from said second brackets, said mounting structure engaging the portion of said cable sheath adjacent said second end of said core thereby to position the engaged cable sheath in a fixed position, the sheath guiding said cores' second end in its movement along a predetermined path; and
   activating means engageable by said second cable core end when moved along its said path of movement, said activating means for effecting a deployment of the safety system for passengers of the vehicle when engaged by said second free end of said cable core.

2. The device of claim 1 wherein: said activating means includes: a pair of generally open, electrical contacts positioned in said path of travel of said cable cores' second end; electrical means for supplying current when said contacts are closed; and gas generation actuation means for producing a volume of gas when said contacts are closed and electric current supplied thereto.

3. The device of claim 1 wherein: said activating means includes: a closed housing adjacent said cable cores' second end; a gas supply canister with a breakable surface thereon, said canister being mounted with its said breakable surface in said closed housing in said path of travel of said cable cores' second end; and a gas supply line connected to said closed housing for supplying gas to the safety system of the vehicle; and wherein: the free end of said cable cores' second end has breaking means thereon for breaking said breakable surface of said gas supply canister.

4. The device of claim 3 wherein: said breaking means of said cable cores' second end is a sharp point; and wherein: said breakable surface of said canister is a puncturable metal surface.

5. The device of claim 1 wherein: a protective member encloses the portion of said first free end of said cable core between its attachment to said second brackets and the associated end of said cable sheath, said protective member being deformed when a force is applied thereto when said core is moved within said cable sheath during a vehicle crash.

* * * * *